(12) United States Patent
Zasowski et al.

(10) Patent No.: US 10,666,318 B2
(45) Date of Patent: May 26, 2020

(54) DIGITAL SUBSCRIBER LINE ACCESS MULTIPLEXER FOR SENDING COMMUNICATION SIGNALS TO CUSTOMER DEVICES

(71) Applicant: Swisscom AG, Bern (CH)

(72) Inventors: Thomas Zasowski, Zurich (CH); Oliver Lamparter, Zurich (CH)

(73) Assignee: SWISSCOM AG, Bern (CH)

( * ) Notice: Subject to any disclaimer, the term of this patent is extended or adjusted under 35 U.S.C. 154(b) by 552 days.

(21) Appl. No.: 14/547,825

(22) Filed: Nov. 19, 2014

(65) Prior Publication Data
US 2015/0138943 A1   May 21, 2015

(30) Foreign Application Priority Data

Nov. 20, 2013 (EP) .................................... 13005443

(51) Int. Cl.
*H04B 3/32* (2006.01)
*H04B 3/487* (2015.01)
*H04M 11/06* (2006.01)

(52) U.S. Cl.
CPC ............... *H04B 3/32* (2013.01); *H04B 3/487* (2015.01); *H04M 11/062* (2013.01)

(58) Field of Classification Search
CPC ......... H04B 3/32; H04B 3/487; H04M 11/062
See application file for complete search history.

(56) References Cited

U.S. PATENT DOCUMENTS

| | | | |
|---|---|---|---|
| 6,266,348 B1* | 7/2001 | Gross | H04L 5/0042 370/252 |
| 2003/0118163 A1 | 6/2003 | Starr | |
| 2012/0121029 A1* | 5/2012 | Ahrndt | H04B 3/32 375/260 |
| 2013/0272314 A1 | 10/2013 | Kuipers et al. | |
| 2014/0023190 A1* | 1/2014 | Liang | H04J 3/10 379/406.08 |

FOREIGN PATENT DOCUMENTS

WO   2013026479   2/2013

OTHER PUBLICATIONS

European Search Report for EP 13005443, dated Mar. 12, 2014 (6 pages).

* cited by examiner

*Primary Examiner* — Mohammad S Anwar
(74) *Attorney, Agent, or Firm* — McAndrews, Held & Malloy, Ltd.

(57) ABSTRACT

Methods and systems are provided for sending and/or receiving communication information by a digital subscriber line access multiplexer to customer devices at one or more customer premises, via customer lines. In particular, the digital subscriber line access multiplexer may be configured to send a communication signal, for a particular customer device, concurrently via more than one customer line. The digital subscriber line access multiplexer may enhance a communication signal, received from a particular customer device, via a particular customer line, such as using a second communication signal received concurrently from the particular customer device via a second customer line.

30 Claims, 3 Drawing Sheets

DIGITAL SUBSCRIBER LINE ACCESS MULTIPLEXER FOR SENDING COMMUNICATION SIGNALS TO CUSTOMER DEVICES

CLAIM OF PRIORITY

Pursuant to 35 U.S.C. § 119, this patent application claims the filing date benefit of and right of priority to European (EP) Patent Application No. 13005443.0, filed Nov. 20, 2013. The above application is hereby incorporated herein by reference in its entirety.

FIELD

The present disclosure relates to communications. In particular, various embodiments in accordance with the present disclosure relate to systems for providing a digital subscriber line access multiplexer for sending communication signals via customer lines to customer devices at one or more customer premises and to methods of sending communication signals via customer lines to customer devices at one or more customer premises.

BACKGROUND

Existing methods and systems for sending communication signals via customer lines to customer devices at customer premises can be costly, cumbersome and inefficient. For example, for operators of telecommunication networks, provisioning of high-speed broadband services using installed infrastructure of lines, such as wired telephone lines of a plain old telephone services (POTS) network, may be of very high importance. Often, telecommunication operators may offer such services using digital subscriber line (DSL) standards. Recently, new technologies and standards such as vectoring or G.fast have been developed, and the feasibility of still higher performance has been demonstrated. Some factors may, however, limit performance of broadband services. Factors limiting the performance of broadband services may include crosstalk between the lines and line attenuation. Crosstalk refers to electromagnetic interference from one line to another line. Various types of crosstalk may exist. For example, near end crosstalk (NEXT) refers to crosstalk measured at the same end of the line with respect to the interfering transmitter. Far end crosstalk (FEXT) refers to crosstalk measured at the other end of the line with respect to the interfering transmitter. Alien crosstalk (AXT) refers to crosstalk caused by lines routed close to the line of interest. Other types of crosstalk may also exist. Crosstalk may limit desired broadband services. For example, in DSL standards, performance is often limited because of far end crosstalk (FEXT).

Certain measures may be used to reduce factors affecting or limiting broadband services. For example, vectoring is a transmission method that may mitigate the effect of crosstalk and improves performance. Crosstalk between lines is estimated and on the transmitting side pre-coding or pre-processing of signals is performed in such a manner that crosstalk injected by other transmitters into a line is cancelled or reduced on the receiving side. Line attenuation increases with line length and signal frequency. Accordingly, with the demand for increased speed of broadband services, which requires higher frequencies, the length of lines must be reduced accordingly, particularly in the case of limited transmit power. However, reducing the length of lines is often not possible, particularly, in the case of already installed lines.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

Systems and/or methods are provided for a digital subscriber line access multiplexer for sending communication signals to customer devices, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

BRIEF DESCRIPTION OF THE DRAWINGS

Various features and advantages of the disclosure will become apparent from the following description of non-limiting exemplary embodiments, with reference to the appended drawings, in which.

DETAILED DESCRIPTION OF THE DISCLOSURE

Figure 1:
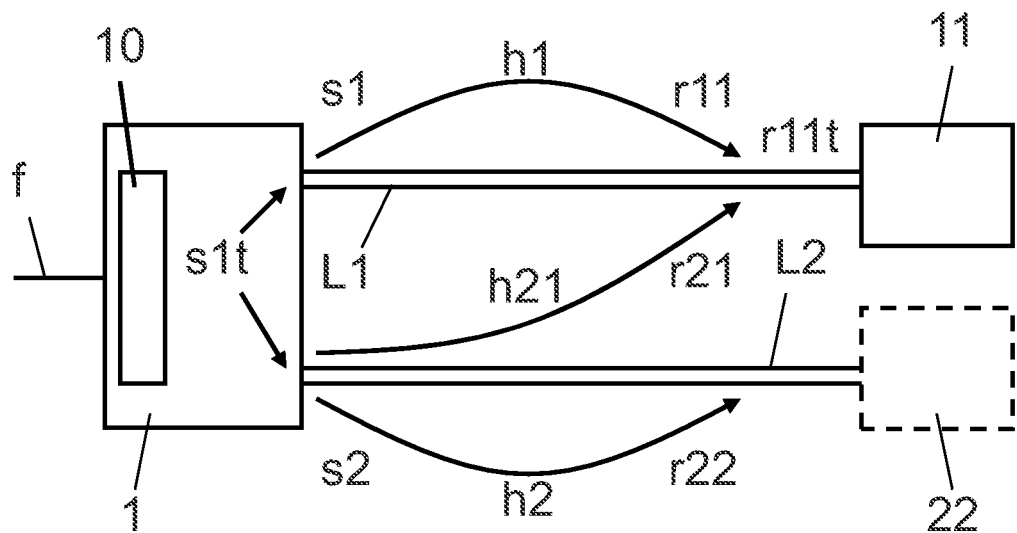
FIG. 1 illustrates an example digital subscriber line access multiplexer for sending communication signals via customer lines to customer devices.

As utilized herein the terms "circuits" and "circuitry" refer to physical electronic components ("hardware") and any software and/or firmware ("code") which may configure the hardware, be executed by the hardware, and or otherwise be associated with the hardware. As used herein, for example, a particular processor and memory may comprise a first "circuit" when executing a first plurality of lines of code and may comprise a second "circuit" when executing a second plurality of lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y." As another example, "x, y, and/or z" means any element of the seven-element set $\{(x), (y), (z), (x, y), (x, z), (y, z), (x, y, z)\}$. In other words, "x, y and/or z" means "one or more of x, y and z." As utilized herein, the terms "block" and "module" refer to functions than can be performed by one or more circuits. As utilized herein, the term "example" means serving as a non-limiting example, instance, or illustration.

As utilized herein, the terms "for example" and "e.g.," introduce a list of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

Certain embodiments of the present disclosure may be found in a method and system for a digital subscriber line access multiplexer for sending communication signals to customer devices, as described in the following in more detail, for example, with reference to the attached figures.

In various embodiments in accordance with the present disclosure, a digital subscriber line access multiplexer, and/or methods related thereto, may be provided for sending communication signals to communication devices, which does not have at least some of the disadvantages of the prior art. In particular, a digital subscriber line access multiplexer may be provided and/or used for sending communication signals to communication devices in a manner that may improve performance of broadband services.

In an example embodiment, a digital subscriber line access multiplexer for sending communication signals via customer lines to customer devices at one or more customer premises may be configured to send a communication signal for a particular customer device concurrently via more than one customer line to the particular customer device. Any number of customer lines may be involved. In this regard, a customer line may be a digital subscriber line based on a wire pair connection. One and the same communication signal may be sent via more than one customer line to the particular customer device. The communication signal may be sent directly to the particular communication device via one of the communication lines. Further, because of crosstalk between the customer lines, the communication signal may be sent as well via a crosstalk channel to the particular customer device. Thus, the power of signals received at the particular customer device may be increased, and the performance of broadband services consequently may be improved. Alternatively, the distance between a digital subscriber line access multiplexer and customer premises may be increased, while maintaining power levels, which may be achieved, without using the effect of crosstalk to improve signal strength.

In an example embodiment, the digital subscriber line multiplexer may be configured to enhance a communication signal, received from a particular customer device via a first customer line, by using a second communication signal received concurrently from the particular customer device via a second customer line. For example, the second communication signal may be received from the particular customer device because of crosstalk, constituting a crosstalk channel, between the first customer line and the second customer line. The communication signal received from the particular customer device via the first customer line may be improved (e.g., its power increased) using the second communication signal, thus the performance of broadband services consequently may be improved.

In an example embodiment, the digital subscriber line access multiplexer may be configured to determine one or more channel coefficients of the transmission channel of a customer line and/or of crosstalk channels between customer lines, and to send the communication signal for the particular customer device using one or more of the determined channel coefficients. For example, the determined channel coefficients may be used to perform pre-processing or pre-coding in such a manner that the power of communication signals, received by the customer device via the more than one customer lines, is increased. Pre-processing or pre-coding may be performed, for example, in such a manner that the delay, caused by the channel of the customer line and the crosstalk channel between the lines, may be equalized.

In an example embodiment, the digital subscriber line access multiplexer may be configured to determine one or more channel coefficients of the transmission channel of a customer line and/or of crosstalk channels between customer lines, and to enhance the communication signal received from a particular customer device, such as using one or more of the determined channel coefficients. For example, the determined channel coefficients may be used to perform post-processing or post-coding in such a manner that the power of communication signals, received by the digital subscriber line access multiplexer via the first and the second customer lines, may be increased. Post-processing or post-coding may performed, for example, in such a manner that the delay caused by the channels may be equalized.

In an example embodiment, the digital subscriber line access multiplexer may be configured to limit communication signals to specific time periods and/or to specific frequency bands. For example, any customer line, which is at least partially inactive, may be used to increase reception power at the customer device or the digital subscriber line access multiplexer. A particular customer line may be inactive because there is no customer device installed at the customer premise, because the customer device is turned off, or because the customer device is turned off during specific time periods. Accordingly, crosstalk channels between customer lines may be used during these specific time periods to increase reception power of communication signals. A particular customer line may be partially inactive because a connected customer device operates only at certain frequencies, leaving specific frequency bands unused. Accordingly, crosstalk channels between the customer lines may be used within these specific frequency bands to increase reception power of communication signals.

In an example embodiment, the digital subscriber line access multiplexer may be configured to use vectoring. By using vectoring, the performance of broadband services may be further improved.

In an example embodiment, the digital subscriber line access multiplexer may be configured to determine status information of one or more customer devices, and to use the status information for selecting the more than one customer lines for sending the communication signal to the particular customer device. For example, the status information may indicate for a customer device whether it is turned on, turned off, or disconnected, and/or its operating frequency. Accordingly, the use of crosstalk channels may be adapted dynamically in response to changes determined based on the status information, particularly changes related to the customer devices, such as customers connecting or disconnecting customer devices, and the performance of broadband services may be further improved.

In an example embodiment, the digital subscriber line access multiplexer may be configured to communicate via one or more broadband fiber optics line. In particular, broadband fiber optics lines are used for communication between the operator of a telecommunications network and the digital subscriber line access multiplexer at high speed, wherein the performance of broadband services may be further improved.

In various example embodiments, communication methods may be used in sending communication signals via customer lines to customer devices at one or more customer premises, such as in conjunction with use of digital subscriber line access multiplexers implemented in accordance with the present disclosure. An example communication method may comprise sending a communication signal for a particular customer device concurrently via more than one customer line to the particular customer device.

In an example embodiment, the communication method may comprise enhancing a communication signal, received from a particular customer device via a first customer line, by using a second communication signal received concurrently from the particular customer device via a second customer line.

In an example embodiment, the communication method may comprise determining channel coefficients of the transmission channels of customer lines and/or of crosstalk channels between customer lines, and sending the communication signal for the particular customer device using one or more of the determined channel coefficients.

In an example embodiment, the communication method may comprise determining one or more channel coefficients of the transmission channels of customer lines and/or of crosstalk channels between customer lines, and enhancing the communication signal received from a particular customer device by using one or more of the determined channel coefficients.

In an example embodiment, the communication method may comprise limiting communication signals to specific time periods and/or to specific frequency bands.

In an example embodiment, the communication method may comprise using vectoring.

In various example embodiments, a computer program product may be used in implementing and/or facilitating various aspects associated with the present disclosure. In particular, the computer program product may comprise a non-transitory computer readable medium having stored thereon computer program code for controlling one or more processors of a digital subscriber line access multiplexer such that the digital subscriber line access multiplexer performs one or more of: sending a communication signal for a particular customer device concurrently via more than one customer line to the particular customer device, and enhancing a communication signal received from a particular customer device via a first customer line by using a second communication signal received concurrently from the particular customer device via a second customer line.

FIG. 1 illustrates an example digital subscriber line access multiplexer for sending communication signals via customer lines to customer devices. Shown in FIG. 1 are a digital subscriber line access multiplexer 1, a first customer device 11 and a second customer device 22. Each of the digital subscriber line access multiplexer 1, a first customer device 11 and a second customer device 22 may comprise suitable circuitry for implementing various aspects of the present disclosure.

As shown in the example implementation depicted in FIG. 1, a first customer line L1 connects the digital subscriber line access multiplexer 1 with the first customer device 11; and a second customer line L2 connects the digital subscriber line access multiplexer 1 with the second customer device 22. As shown in FIG. 1 (and similarly in FIG. 2), the second customer device 22 is drawn using dotted lines, because the second customer device 22 is assumed to be at least partially inactive, as described in more detail below.

As shown in the example implementation depicted in FIG. 1, the digital subscriber line access multiplexer 1 may comprise a circuit 10 operable and/or configured to control operations of the digital subscriber line access multiplexer 1. In an example implementation, the circuit 10 may comprise one or more processors. The circuit 10 (and/or elements thereof—e.g., any processor(s) therein) may be controlled, such as by programmed software modules, by or another programmed logic unit (that is, a hardware element), and/or by combination of hardware and software components. The computer program code for controlling the circuit 10 (and/or elements thereof—e.g., any processor(s) therein) may be stored on a non-transitory computer readable medium, which is connected to the circuit 10 (or elements thereof) in a fixed or removable fashion.

The circuit 10 may be configured to selectively route communication signals to one or more customer line L1, L2 connected to the digital subscriber line access multiplexer 1, and to selectively receive communication signals from one or more customer line L1, L2 connected to the digital subscriber line access multiplexer 1, as described in more detail in the following paragraphs. The circuit 10 may be further configured to perform various (other) functions—e.g., pre-processing or pre-coding functions, post-processing or post-coding functions, etc., as described in the following paragraphs.

Each of the customer lines L1, L2 may run from the digital subscriber line access multiplexer 1 to particular customer premises or locations, such as customer apartments, customer houses, customer offices, etc. In some example implementations, the customer lines L1, L2 may run in parallel. For example, the digital subscriber line access multiplexer 1 may be installed at a certain location—e.g., in a control box installed close to a street. Further, the customer lines L1, L2 may be arranged as interconnections between the digital subscriber line access multiplexer 1 and apartments of one or several houses. Between the digital subscriber line access multiplexer 1 and particular premises, the customer lines L1, L2 run in parallel. Inside the premises, the customer lines L1, L2 may run in parallel as well, until one or more customer lines L1, L2 branch off to a particular apartment.

In an example implementation, two or more customer lines may be installed between the digital subscriber line access multiplexer 1 and particular customer premises. In this these, two or more customer lines L1, L2 may run in parallel along the entire path from the digital subscriber line access multiplexer 1 to the customer premises.

Where customer lines L1, L2 run in parallel, there may be, at least to some extent, crosstalk between these lines L1, L2. Such crosstalk may occur in both uplink and downlink directions. For example, as described below, an example downlink case may relate to a crosstalk channel h21 between the second line L2 and the first line L1; whereas an example uplink case may relate to a crosstalk channel h12 between the first customer line L1 and the second customer line L2.

As mentioned above, the second customer device 22 may be assumed to be at least partially inactive, for example because the second customer device 22 may not be turned on, at least not at all times, or because the second customer device 22 may not be installed at all. The at least partially inactive second customer device 22 may characterized by one or more of the following states: the second customer device 22 is not installed, the second customer device 22 is not connected to the customer line L2, the second customer device 22 is turned off, and/or the second customer device 22 is operating at certain (specific) frequencies.

In such instances where the second customer device 22 may be at least partially inactive, the second line L2 may be at least partially inactive as well. Accordingly, the second line L2, which is installed between the digital subscriber line access multiplexer 1 and a particular customer premises, may not be used, may be used only during particular time periods, and/or may not be used only at certain frequencies. Thus, the various example scenarios described below may refer to cases where the second line L2 is not used at all, to time periods where the second line L2 is not used, and/or to specific frequency bands, which are not used by the second line L2.

In the downlink case, which is depicted in FIG. 1, the digital subscriber line access multiplexer 1 may send a communication signal s1t for the first customer device 11 concurrently via more than one customer lines L1, L2. The communication signal s1t may be transmitted as a first communication signal s1 via the first customer line L1 to the first customer device 11. Further, the communication signal s1t may be sent as a second communication signal s2 via the second customer line L2. The second communication signal s2 may be sent via the second customer line L2 to the second customer device 22. Further, because of crosstalk, the second communication signal s2 may also be "sent" (that is unintentionally) via crosstalk channel h21, between the second customer line L2 and the first customer line L1, to the first customer device 11, where it may be superimposed with the communication signal s1 sent via the first customer line L1.

A mathematical representation (e.g., of crosstalk channels) is given hereafter assuming a flat channel. Nonetheless, in case of a non-flat channel, the mathematical representation is adapted accordingly using a vector notation. In case of an OFDM (Orthogonal Frequency-Division Multiplexing) system, the mathematical representation may be related to one subcarrier.

Accordingly, the communication signal r11t received at customer device 11 may be a superimposition of the communication signal r11 received via the first line L1 and the communication signal r21 received via the crosstalk channel h21, between the second line L2 and the first line L1. Thus, the communication signal r11t may be expressed as:

$$r11t = r11 + r21 = s1*h1 + s2*h21 \qquad (1)$$

where h1 denotes the channel coefficients of the first customer line L1, and h21 denotes the channel coefficients of the crosstalk channel h21, between the second customer line L2 and the first customer line L1.

In case the second communication signal s2 sent via the crosstalk channel h21, between the second line L2 and the first line L1, is equal to the first communication signal s1, sent via the first customer line L1, the communication signal r11t received at customer device 11 may be expressed as:

$$r11t = s1*h1 + s1*h21 = s1*(h1 + h21) \qquad (2)$$

If the channel coefficients h1, h21 add up to a positive number, the power of the communication signal r11t received via the first customer line L1 and via the crosstalk channel h21 between the second customer line L2 and the first customer line L1 may be increased with respect to the communication signal r11 received via the first customer line L1 alone.

In order to avoid channel coefficients h1 and h21 cancelling each other, pre-processing or pre-coding may be applied. For example, the first communication signal s1 and the second communication signal s2 may be pre-processed or pre-coded (e.g., in the circuit 10 of the digital subscriber line access multiplexer 1), before being sent via the respective line or crosstalk channel. In this regard, any known pre-processing or pre-coding scheme can be applied. For example, pre-processing or pre-coding using the conjugate complex of the channel coefficients h1', h21' may be applied. As a result, the communication signal r11t received at the first customer device 11 may be expressed as:

$$r11t = h1*h1'*s1 + h21*h21'*s1 = (h1^2 + h21^2)*s1 \qquad (3)$$

Accordingly, the channel coefficients h1, h21 add up to a positive value, irrespective of the channel coefficients being positive or negative, and the power of the communication signal r11t received via the first customer line L1 and via the crosstalk channel h21, between the second customer line L2 and the first customer line L1, may be increased with respect to the power of the communication signal r11 received via the first customer line L1 alone.

Figure 2:
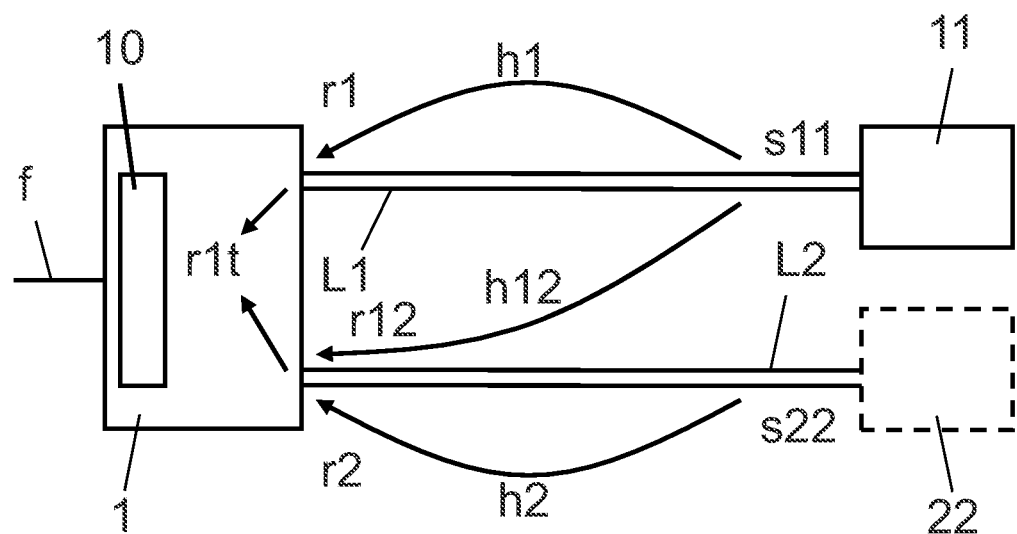
FIG. 2 illustrates an example digital subscriber line access multiplexer for enhancing a communication signal received via a customer line from a customer device.

FIG. 2 illustrates an example digital subscriber line access multiplexer for enhancing a communication signal received via a customer line from a customer device. Shown in FIG. 2 are a digital subscriber line access multiplexer 1, the first customer device 11 and the second customer device 22 of FIG. 1. As illustrated in FIG. 2, however, these elements are shown during the uplink case, in which the digital subscriber line access multiplexer 1 may be operable to enhance a communication signal r1 received from the first customer device 11 via the first customer line L1, by using a second communication signal r12 received concurrently from the customer device 11 via the second customer line L2.

The communication signal r1 received from the first customer device 11 via the first customer line L1 may be received because the first customer device 11 sends a signal s11 via the first customer line L1. The second communication signal r12 received from the first customer device 11 is received because of crosstalk resulting from the first customer device 11 sending the signal s11 (e.g., because of the crosstalk channel h12, between the first line L1 and the second line L2). As the second customer device 22 is inactive, in the sense as described above, no communication signal r2 is received via the second customer line L2 from the second customer device 22.

Enhancing the communication signal r1 received from the first customer device 11 may be based on the superimposition of the communication signal r1 and the communication signal r12 received via second customer line L2, because of crosstalk between the first customer line L1 and the second customer line L2. The enhanced communication signal r1t may be expressed as:

$$r1t = r1 + r12 = h1*s11 + h12*s11 = (h1 + h12)*s11 \qquad (4)$$

If the channel coefficients h1, h21 add up to a positive value, the power of the enhanced communication signal r1t is increased with respect to the communication signal r1 received from the first customer device 11 via the first customer line L1 alone.

In some implementations, post-processing and/or post-coding may be applied to received signals (e.g., in the circuit 10 of the digital subscriber line access multiplexer 1). For example, post-processing or post-coding may be applied when enhancing the communication signal r1, such as based on multiplication with the conjugate complex of the channel coefficients. In such cases, the enhanced communication signal r1t may expressed as:

$$r1t = h1'*h1*s11 + h12'*h12*s11 = (h1^2 + h12^2)*s11 \qquad (5)$$

Accordingly, channel coefficients h1, h12 may add up to a positive value, irrespective of the channel coefficients being positive or negative, and power of the enhanced communication signal r1t is increased with respect to the power of the communication signal r1 received via the first customer line L1 alone.

During the downlink or uplink scenarios (shown in FIGS. 1 and 2, respectively), In order to apply pre-processing or post-processing, channel coefficients (e.g., h1, h2, h21, h12) may have to be determined. In this regard, any suitable technique or mechanism may be used to make that determination. For example, in some instances the determination may be based on use (e.g., transmission) of training sequences may be applied in order to determine channel coefficients h1, h2, h21, h12.

The customer lines L1, L2 may comprise, for example, wired lines already widely deployed, such as wired lines installed for use in plain old telephone services (POTS) network (e.g., wire pairs such as copper wire pairs).

In an example implementation, the digital subscriber line access multiplexer 1 may be configured to limit communication signals to specific time periods and/or to specific frequency bands. For example, in instances where the second customer device 22 is operating during certain time periods, the second line L2 may not be used for transmitting a communication signal to the first customer device 11 or for enhancing a communication signal r1 received via the first customer line L1. Similarly, in instances where the second customer device 22 operates using certain frequencies, the second line L2 may be used at other specific frequency bands for transmitting and/or receiving communication signals. Thus, outside the specific time periods and/or the specific frequency bands, the digital subscriber line access multiplexer 1 may send (as shown in FIG. 1) a communication signal s2 via the second customer line L2 to the second customer device 22, wherein a communication signal r22=h2*s2 may be received at the second customer device 22, and/or the digital subscriber line access multiplexer 1 may receive (as shown in FIG. 2) a communication signal r2 via the second customer line L2 from the second customer device 22, wherein the second customer device 22 may send a communication signal s22 and a communication signal r2=h2*s22 is received.

In an example implementation, the digital subscriber line access multiplexer 1 may be configured to use vectoring in order to further increase signal quality.

In an example implementation, the digital subscriber line access multiplexer 1 may be configured to determine the status information of customer devices 11, 22. For example, determining status information may be done by measuring the impedance of the customer lines L1, L2, or by detecting particular signals on the customer lines L1, L2, etc. Status information of customer devices 11, 22 may comprise information such as a particular customer device 11, 22 being connected to a customer line L1, L2, a particular customer device 11, 22 being turned on or turned off, a particular customer device 11, 22 being turned on during particular time periods, a particular customer device 11, 22 operating at particular frequency bands, etc. The status information may be used to select customer lines L1, L2 adapted for transmission or reception of communication signals.

In an example implementation, the digital subscriber line access multiplexer 1 may be configured to communicate via one or more broadband fiber optics lines f. The broadband fiber optics lines f may be used to communicate with communication devices installed at premises of a telecommunications network operator.

Figure 3:
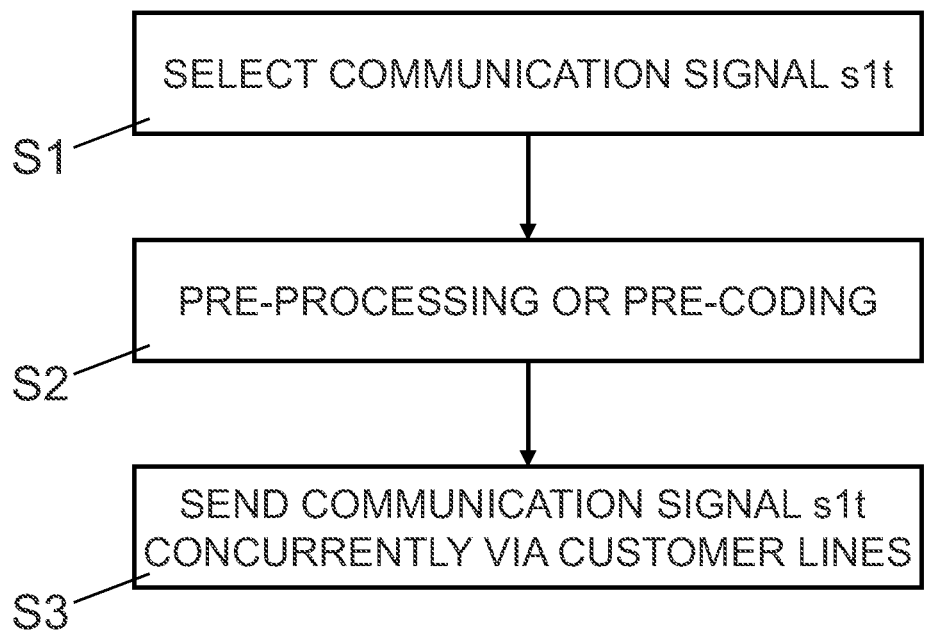
FIG. 3 is a flow diagram illustrating an example process for sending communication signals via customer lines to customer devices.

FIG. 3 is a flow diagram illustrating an example process for sending communication signals via customer lines to customer devices. Shown in FIG. 3 is a flow diagram illustrating a sequence of example steps for sending communication signals via customer lines to customer devices.

In example step S1, a communication signal (e.g., signal s1t) for a particular communication device (e.g., device 11) may be selected.

In example (optional) step S2, pre-processing or pre-coding of the communication signal s1t may be performed (e.g., in circuit 10 of the digital subscriber line access multiplexer 1).

In example step S3, the communication signal may be sent concurrently via more than one customer line (e.g., lines L1, L2) to the particular customer device.

Figure 4:
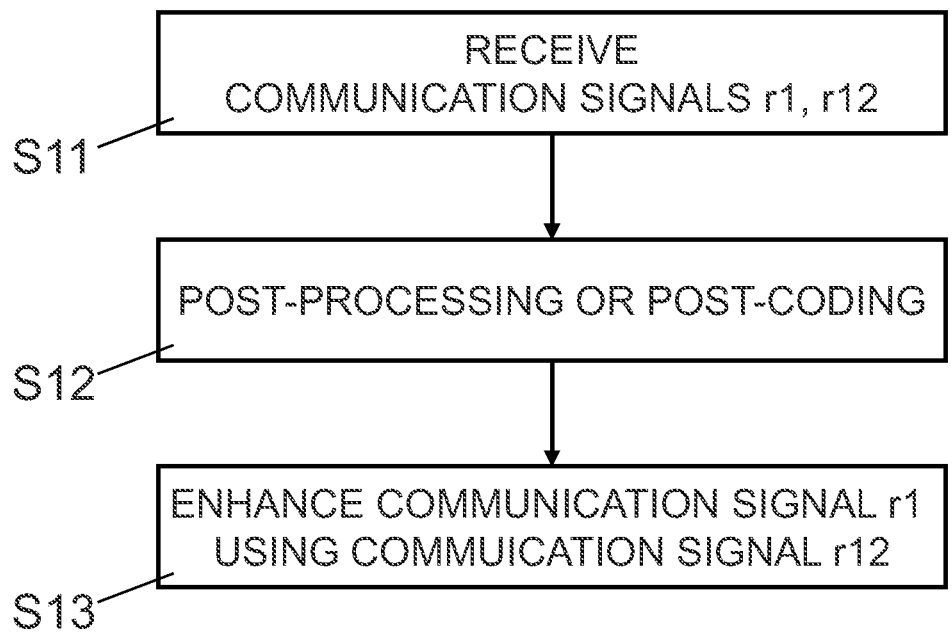
FIG. 4 is a flow diagram illustrating an example process for enhancing a communication signal received via a customer line from a customer device.

FIG. 4 is a flow diagram illustrating an example process for enhancing a communication signal received via a customer line from a customer device. Shown in FIG. 4 is a flow diagram illustrating a sequence of example steps for enhancing a communication signal received via a customer line from a customer device.

In example step S11, a communication signal (e.g., signal r1) may be received from a particular customer device (e.g., device 11) via the first customer line (e.g., line L1) and a second communication signal (e.g., signal r12) may be received concurrently from the particular customer device via the second customer line (e.g., line L2).

In example (optional) step S12, post-processing or post-coding of the received communication signals r1, r12 may be performed (e.g., in circuit 10 of the digital subscriber line access multiplexer 1).

In example step S13, the second communication signal r12 is used to enhance the communication signal r1 received from the particular customer device 11 via the first customer line L1.

With reference to the processes depicted in FIGS. 3 and 4, the example steps may be performed by the digital subscriber line access multiplexer 1 as directed or controlled by circuit 10.

Figure 5:
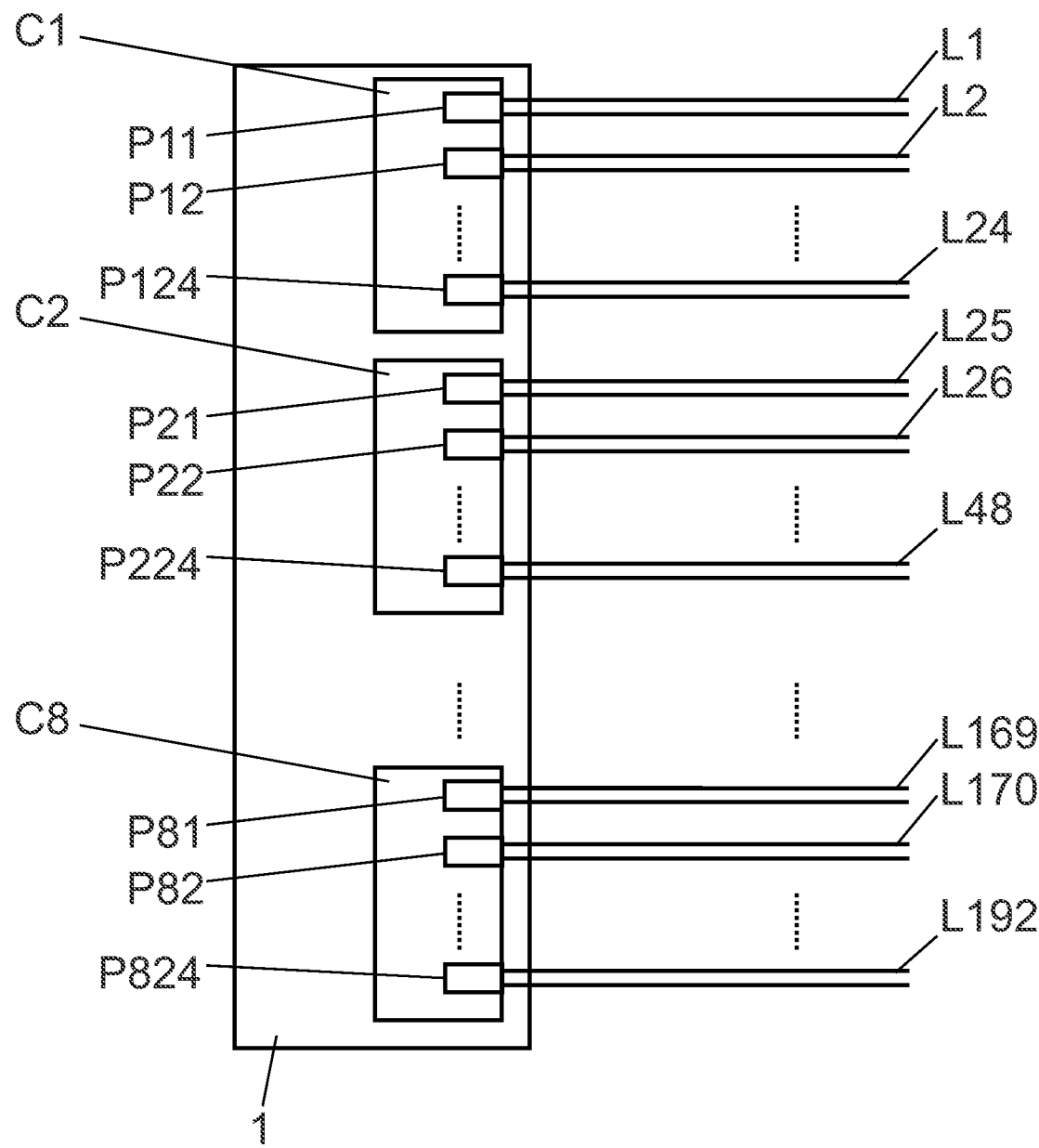
FIG. 5 illustrates an example digital subscriber line access multiplexer that comprises multiple aggregation cards, where each aggregation card has a number of ports, and where each port is connected to a customer line.

FIG. 5 illustrates an example digital subscriber line access multiplexer that comprises multiple aggregation cards, where each aggregation card has a number of ports, and where each port is connected to a customer line. Shown in FIG. 5 is an example implementation of a digital subscriber line access multiplexer (e.g., the digital subscriber line access multiplexer 1 of FIGS. 1 and 2) which may comprise one or more aggregation cards (e.g., eight aggregation cards: C1, C2, . . . C8). Each of the aggregation cards Ci may comprise a plurality of ports (e.g., twenty-four ports: P11, P12, P124, . . . P824, with each of the eight aggregation cards C1, C2, . . . C8 comprising four ports). Each of the ports (e.g., each of the twenty-four ports P11, P12, P124, . . . P824) may be configured to have (or be connected to) a corresponding customer line—e.g., one of customer lines L1, L2, . . . L24, L25, . . . L48, . . . L169, L170, . . . L192. Thus, the number of customer lines L1, L2 that may be connected to the digital subscriber line access multiplexer 1 may be large—e.g., several dozens, several hundreds, or more.

As shown in FIG. 5, in some installations, a large number of customer lines L1, L2, . . . L24, . . . , L169, . . . , L192 may be connected to the digital subscriber line access multiplexer 1, with the digital subscriber line access multiplexer 1 being configured such that, in both the downlink case and the uplink case (as described above), any number of cross talk channels between any customer lines L1, L2, . . . L24, . . . , L169, . . . , L192 may be used for sending a communication signal (e.g., signal s1t) to a first customer device (e.g., the customer device 11) and/or for enhancing communication signal (e.g., signal r1) received from the first customer device.

Other embodiments of the disclosure may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein.

Accordingly, the present disclosure may be realized in hardware, software, or a combination of hardware and software. The present disclosure may be realized in a centralized fashion in at least one computer system, or in a distributed fashion where different units are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure makes reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A system, comprising:
a digital subscriber line access multiplexer operable to send and/or receive communication signals to and/or from customer devices at one or more customer premises, via customer lines;
wherein the digital subscriber line access multiplexer is configured to:
send downlink communication signals for a particular customer device concurrently via more than one customer line to the particular customer device;
receive uplink communication signals from the particular customer device, wherein the receiving of uplink communication signals comprises utilizing more than one customer line between the particular customer device and the digital subscriber line access multiplexer; and
enhance a first uplink communication signal, received from the particular customer device via a first customer line, using a second uplink communication signal received concurrently from the particular customer device via a second customer line.

2. The system of claim 1, wherein the digital subscriber line access multiplexer is configured to:
determine channel coefficients of one or more of the following channels: transmission channels of a customer line and crosstalk channels between customer lines; and
send the downlink communication signals for the particular customer device using one or more of the determined channel coefficients.

3. The system of claim 1, wherein the digital subscriber line access multiplexer is configured to:
determine channel coefficients of one or more of the following channels: transmission channels of a customer line and crosstalk channels between customer lines; and
enhance the uplink communication signals received from the particular customer device using one or more of the determined channel coefficients.

4. The system of claim 1, wherein the digital subscriber line access multiplexer is configured to limit the sending and/or receiving of communication signals to specific time periods and/or specific frequency bands.

5. The system of claim 1, wherein the digital subscriber line access multiplexer is configured to use vectoring.

6. The system of claim 1, wherein the digital subscriber line access multiplexer is configured to:
determine one or more of the following status information of one or more customer devices: turned on, turned off, disconnected, and operating frequency; and
use the status information for selecting the more than one customer line for sending the downlink communication signals to the particular customer device.

7. The system of claim 1, wherein the digital subscriber line access multiplexer is configured to communicate via one or more broadband fiber optics lines.

8. A method for communication, comprising:
sending and/or receiving by a digital subscriber line access multiplexer, communication signals to and/or from customer devices at one or more customer premises, via customer lines;
wherein:
the sending comprises sending downlink communication signals for a particular customer device concurrently via more than one customer line to the particular customer device;
receiving uplink communication signals from the particular customer device, wherein the receiving of uplink communication signals comprises utilizing more than one customer line between the particular customer device and the digital subscriber line access multiplexer; and
enhancing a first uplink communication signal, received from the particular customer device via a first customer line, using a second uplink communication signal received concurrently from the particular customer device via a second customer line.

9. The method of claim 8, comprising:
determining channel coefficients of one or more of the following channels: transmission channels of customer lines and crosstalk channels between customer lines; and
sending the downlink communication signals for the particular customer device using one or more of the determined channel coefficients.

10. The method of claim 8, comprising:
  determining channel coefficients of one or more of the following channels: transmission channels of customer lines and crosstalk channels between customer lines; and
  enhancing the uplink communication signals received from the particular customer device using one or more of the determined channel coefficients.

11. The method of claim 8, comprising limiting the sending and/or receiving of communication signals to specific time periods and/or specific frequency bands.

12. The method of claim 8, comprising using vectoring.

13. A computer program product, comprising a non-transitory computer readable medium having stored thereon computer program code for controlling one or more processors or circuits of a digital subscriber line access multiplexer to cause the digital subscriber line access multiplexer to perform:
  sending downlink communication signals for a particular customer device concurrently via more than one customer line to the particular customer device; and
  receiving uplink communication signals from the particular customer device, wherein the receiving of uplink communication signals comprises utilizing more than one customer line between the particular customer device and the digital subscriber line access multiplexer; and
  enhancing a first uplink communication signal, received from the particular customer device via a first particular customer line, using a second uplink communication signal received concurrently from the particular customer device via a second customer line.

14. The computer program product of claim 13, wherein the digital subscriber line access multiplexer is caused to determine channel coefficients of one or more of the following channels: transmission channels of customer lines and crosstalk channels between customer lines.

15. The computer program product of claim 14, wherein the digital subscriber line access multiplexer is caused to send the downlink communication signals for the particular customer device using one or more of the determined channel coefficients.

16. The computer program product of claim 14, wherein the digital subscriber line access multiplexer is caused to enhance the uplink communication signals, received from the particular customer device using one or more of the determined channel coefficients.

17. The computer program product of claim 13, wherein the digital subscriber line access multiplexer is caused to limit the sending and/or receiving of communication signals to specific time periods and/or specific frequency bands.

18. A system, comprising:
  a digital subscriber line access multiplexer operable to send and/or receive communication signals to and/or from customer devices at one or more customer premises, via customer lines;
  wherein the digital subscriber line access multiplexer is configured to:
    send downlink communication signals for a particular customer device concurrently via more than one customer line to the particular customer device;
    receive uplink communication signals from the particular customer device, wherein the receiving of uplink communication signals comprises utilizing more than one customer line between the particular customer device and the digital subscriber line access multiplexer;
    determine channel coefficients of one or more of the following channels: transmission channels of a customer line and crosstalk channels between customer lines; and
    enhance the uplink communication signals received from the particular customer device using one or more of the determined channel coefficients.

19. The system of claim 18, wherein the digital subscriber line access multiplexer is configured to send the downlink communication signals for the particular customer device using one or more of the determined channel coefficients.

20. The system of claim 18, wherein the digital subscriber line access multiplexer is configured to limit the sending and/or receiving of communication signals to specific time periods and/or specific frequency bands.

21. The system of claim 18, wherein the digital subscriber line access multiplexer is configured to use vectoring.

22. The system of claim 18, wherein the digital subscriber line access multiplexer is configured to:
  determine one or more of the following status information of one or more customer devices: turned on, turned off, disconnected, and operating frequency; and
  use the status information for selecting the more than one customer line for sending the downlink communication signals to the particular customer device.

23. The system of claim 18, wherein the digital subscriber line access multiplexer is configured to communicate via one or more broadband fiber optics lines.

24. A method for communication, comprising:
  sending and/or receiving by a digital subscriber line access multiplexer, communication signals to and/or from customer devices at one or more customer premises, via customer lines;
  wherein:
    the sending comprises sending downlink communication signals for a particular customer device concurrently via more than one customer line to the particular customer device;
    receiving uplink communication signals from the particular customer device, wherein the receiving of uplink communication signals comprises utilizing more than one customer line between the particular customer device and the digital subscriber line access multiplexer;
    determining channel coefficients of one or more of the following channels: transmission channels of customer lines and crosstalk channels between customer lines; and
    enhancing the uplink communication signals received from the particular customer device using one or more of the determined channel coefficients.

25. The method of claim 24, comprising sending the downlink communication signals for the particular customer device using one or more of the determined channel coefficients.

26. The method of claim 24, comprising limiting the sending and/or receiving of communication signals to specific time periods and/or specific frequency bands.

27. The method of claim 24, comprising using vectoring.

28. A computer program product, comprising a non-transitory computer readable medium having stored thereon computer program code for controlling one or more processors or circuits of a digital subscriber line access multiplexer to cause the digital subscriber line access multiplexer to perform:

sending downlink communication signals for a particular customer device concurrently via more than one customer line to the particular customer device;

receiving uplink communication signals from the particular customer device, wherein the receiving of uplink communication signals comprises utilizing more than one customer line between the particular customer device and the digital subscriber line access multiplexer;

determining channel coefficients of one or more of the following channels: transmission channels of customer lines and crosstalk channels between customer lines; and enhancing the uplink communication signals, received from the particular customer device using one or more of the determined channel coefficients.

29. The computer program product of claim 28, wherein the digital subscriber line access multiplexer is caused to send the downlink communication signals for the particular customer device using one or more of the determined channel coefficients.

30. The computer program product of claim 28, wherein the digital subscriber line access multiplexer is caused to limit the sending and/or receiving of communication signals to specific time periods and/or specific frequency bands.

* * * * *